(12) United States Patent
Bommarito et al.

(10) Patent No.: US 7,001,122 B2
(45) Date of Patent: Feb. 21, 2006

(54) VEHICLE BED LINER HAVING CARGO RESTRAINING HOLES

(75) Inventors: Joseph W. Bommarito, 5866 Howard Rd., Petoskey, MI (US) 49770; John E. Nemazi, Bloomfield Hills, MI (US)

(73) Assignee: Joseph W. Bommarito, Petosky, MI (US)

(*) Notice: Subject to any disclaimer, the term of this patent is extended or adjusted under 35 U.S.C. 154(b) by 0 days.

(21) Appl. No.: 10/657,772

(22) Filed: Sep. 8, 2003

(65) Prior Publication Data

US 2004/0119310 A1 Jun. 24, 2004

Related U.S. Application Data

(60) Provisional application No. 60/409,358, filed on Sep. 9, 2002.

(51) Int. Cl.
*B60P 7/08* (2006.01)
(52) U.S. Cl. .................... 410/102; 410/97; 410/106; 410/108; 410/115; 296/39.2
(58) Field of Classification Search ........... 410/102, 410/106, 108–110, 112–113, 115–116, 77, 410/97; 296/39.1, 39.2, 41; 224/403, 404
See application file for complete search history.

(56) References Cited

U.S. PATENT DOCUMENTS

| | | | |
|---|---|---|---|
| 4,253,785 A | 3/1981 | Bronstein | |
| 4,279,439 A | 7/1981 | Cantieri | |
| 4,502,619 A | 3/1985 | Cox | |
| 4,592,583 A | 6/1986 | Dresen et al. | |
| 4,772,165 A | 9/1988 | Bartkus | |
| 4,850,633 A | 7/1989 | Emery | |
| 4,850,769 A * | 7/1989 | Matthews | 410/105 |
| 4,875,731 A | 10/1989 | Ruiz | |
| 4,954,031 A | 9/1990 | Geeck, III | |
| 5,052,737 A | 10/1991 | Farmer, Jr. | |
| 5,253,918 A | 10/1993 | Wood et al. | |
| 5,257,848 A | 11/1993 | Coletti et al. | |
| 5,267,820 A | 12/1993 | Sturtevant | |
| 5,419,603 A | 5/1995 | Kremer et al. | |
| 5,533,848 A * | 7/1996 | Davis | 410/105 |
| 5,597,193 A | 1/1997 | Conner | |
| 5,636,883 A | 6/1997 | Johns | |
| 5,673,956 A | 10/1997 | Emery | |
| 5,738,471 A * | 4/1998 | Zentner et al. | 410/110 |
| 5,827,023 A * | 10/1998 | Stull | 410/110 |

(Continued)

*Primary Examiner*—Stephen Gordon
(74) *Attorney, Agent, or Firm*—Brooks Kushman P.C.

(57) ABSTRACT

A truck bed liner for a truck bed having a bed floor and two opposing bed walls is provided. The bed liner includes a bed floor configured to be disposed along the floor of the truck bed. The bed liner also includes two opposing side walls which conform the truck bed side walls, and a third wall attached to the side walls near the front of the truck bed. Each of the side walls includes a rail integrally formed with a corresponding side wall, and running the length of the side wall. Each of the rails includes a plurality of threaded holes which can be used to attach cargo items using threaded fasteners. Each of the holes also includes a cleanout, which provides for removal of dirt and debris from the holes, and facilitates the use of a lockable threaded fastener to more securely attach cargo items to the bed liner.

20 Claims, 4 Drawing Sheets

U.S. PATENT DOCUMENTS

| | | |
|---|---|---|
| RE36,073 E | 2/1999 | Kremer et al. |
| 5,927,787 A | 7/1999 | Emery et al. |
| 6,022,062 A * | 2/2000 | Fleenor .................... 296/39.2 |
| 6,039,520 A | 3/2000 | Cheng |
| 6,203,090 B1 | 3/2001 | Vitoorapakorn |
| 6,416,265 B1 | 7/2002 | Flores et al. |
| 6,439,815 B1 * | 8/2002 | Liu ............................ 410/106 |
| 6,481,604 B1 * | 11/2002 | Beene et al. |
| 6,585,465 B1 * | 7/2003 | Hammond et al. ......... 410/104 |
| 2001/0031185 A1 | 10/2001 | Swensen |
| 2002/0012576 A1 * | 1/2002 | Anderson ................... 410/106 |
| 2004/0028497 A1 * | 2/2004 | Wheatley ................... 410/115 |

* cited by examiner

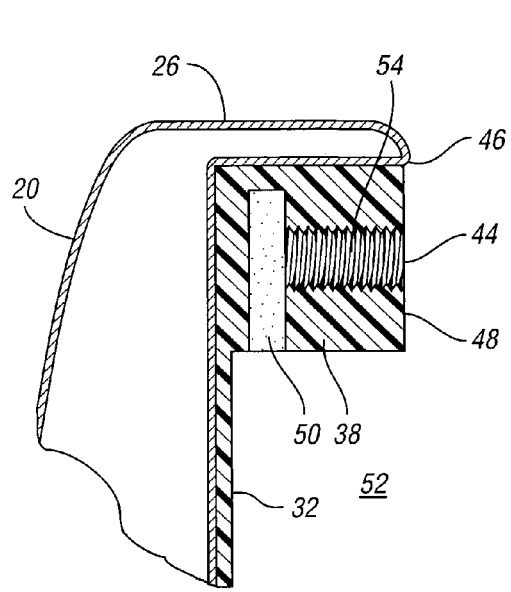
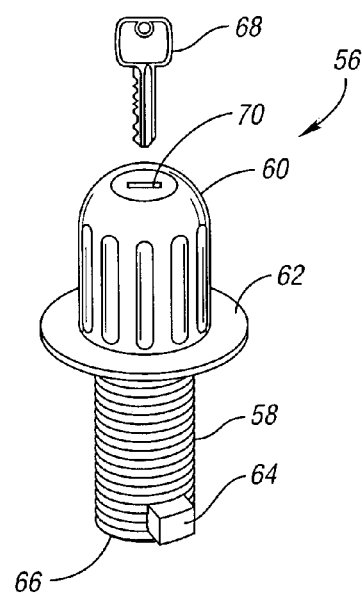
Fig. 3
Fig. 4
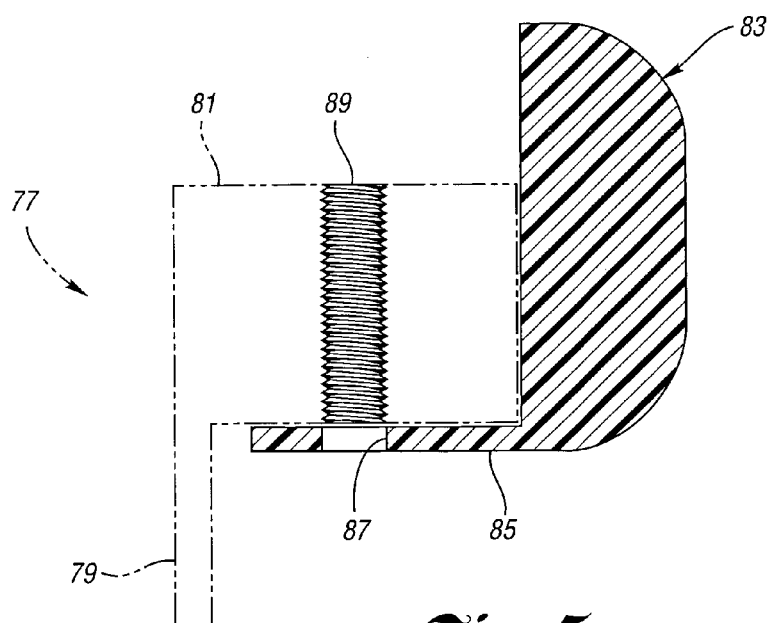
Fig. 5

VEHICLE BED LINER HAVING CARGO RESTRAINING HOLES

CROSS-REFERENCE TO RELATED APPLICATIONS

This application claims the benefit of U.S. provisional application Ser. No. 60/409,358, filed Sep. 9, 2002.

BACKGROUND OF THE INVENTION

1. Field of the Invention

The present invention relates to a vehicle bed liner having cargo restraining holes.

2. Background Art

With the increase in popularity of pickup trucks, the use of truck bed liners has also increased. In addition, other types of cargo-carrying vehicles—e.g., sport utility vehicles (SUV) and station wagons—may also utilize some kind of tray or bed liner for the cargo-carrying area. In addition to protecting the vehicle bed, a bed liner may also provide attachment features so that various items of cargo can be secured.

One such bed liner is described in U.S. Pat. No. 5,253,918 issued to Wood et al. on Oct. 19, 1993. Wood et al. describes a truck bed liner that can be configured with a number of attachment features. For example, a washer may be formed into the truck bed liner to strengthen the relatively thin wall of the bed liner, which may be prone to tearing or deforming when items are attached to it. In addition, Wood et al. describes the use of a nut formed into the truck bed liner, thereby providing a point of attachment for a bolt or machine screw. Wood et al. describes other embodiments of the truck bed liner, including embodiments which have protrusions extending upward from the bed liner, and configured with holes which may be used to receive a bolt, which can then be used to attach other types of fasteners, such as nuts or hinges.

One limitation of the truck bed liner described in Wood et al. is that it relies on a nut to be formed integrally with the truck bed liner in order to provide a threaded attachment feature for a bolt or machine screw. Moreover, in the embodiments which describe the use of a protrusion to receive a bolt, the configuration of the protrusions may be aesthetically unpleasing, may interfere with easy loading and unloading of cargo, and further, use of the bolts still requires an additional fastener such as a nut or a hinge.

Therefore, a need exists for a vehicle bed liner having cargo restraining holes that can directly receive a threaded fastener, such as a bolt, without the need for additional elements, such as nuts to provide mating threads for the fastener, and one that does not require the use of inconvenient protrusions to provide a hole configured to receive a bolt which nonetheless still requires another fastener, such as a nut.

SUMMARY OF THE INVENTION

Accordingly, the present invention provides a bed liner for a vehicle having a vehicle bed including a floor. The bed liner includes a first wall configured to be disposed proximate and generally parallel to the vehicle bed floor. The bed liner also includes two opposing side walls attached to the first wall, each of which extends outward from the first wall. A reinforcing member is attached to a distal edge of each of the side walls, and each of the reinforcing members includes a plurality of threaded holes therein.

The invention also provides a bed liner for a truck having a truck bed defined by a bed floor and two opposing bed walls. Each of the bed walls includes a lip extending into the truck bed and disposed along a length of a corresponding bed wall. The bed liner includes a first wall configured to be disposed proximate and generally parallel to the bed floor. The bed liner also includes two opposing side walls, which are integrally formed with the first wall, and which extend outward therefrom. A reinforcing member is attached to each of the side walls along a length of a corresponding side wall. Each of the reinforcing members includes a plurality of threaded holes therein, and at least some of the threaded holes are oriented generally parallel to the bed floor.

The invention further provides a method of manufacturing a bed liner for a truck having a truck bed defined by a bed floor and two opposing bed walls. Each of the bed walls includes a lip extending into the truck bed and disposed along a length of a corresponding bed wall. The method includes forming a unitary structure, including a first wall and two opposing side walls which extend outward from the first wall. The first wall is configured to be disposed proximate and generally parallel to the bed floor. Each of the side walls includes a distal edge disposed away from, and generally parallel to, the first wall. A pair of rails are formed, with each rail being configured for attachment to a corresponding side wall. A plurality of holes are formed in each of the rails, and threads are formed in at least some of the holes. The method also includes attaching each of the rails to a corresponding side wall.

The invention also provides a method of manufacturing a bed liner for a truck having a truck bed defined by a bed floor and two opposing bed walls. Each of the bed walls includes a lip extending into the truck bed and disposed along a length of a corresponding bed wall. The method includes forming a unitary structure, including a first wall and two opposing side walls which extend outward from the first wall. The first wall is configured to be disposed proximate and generally parallel to the bed floor. Each of the side walls includes a reinforcing member. The method also includes forming a plurality of holes in each of the reinforcing members, and forming threads in at least some of the holes.

BRIEF DESCRIPTION OF THE DRAWINGS

FIG. 3 is a partial fragmentary sectional view of a portion of the bed liner and truck bed shown in FIG. 1;

FIG. 4 is a perspective view of a lockable threaded fastener and a key used to lock and unlock the fastener;

FIG. 5 is a side sectional view of a soft bumper accessory attached to a bed liner rail shown in phantom;

DETAILED DESCRIPTION OF THE PREFERRED EMBODIMENT(S)

Figure 1:
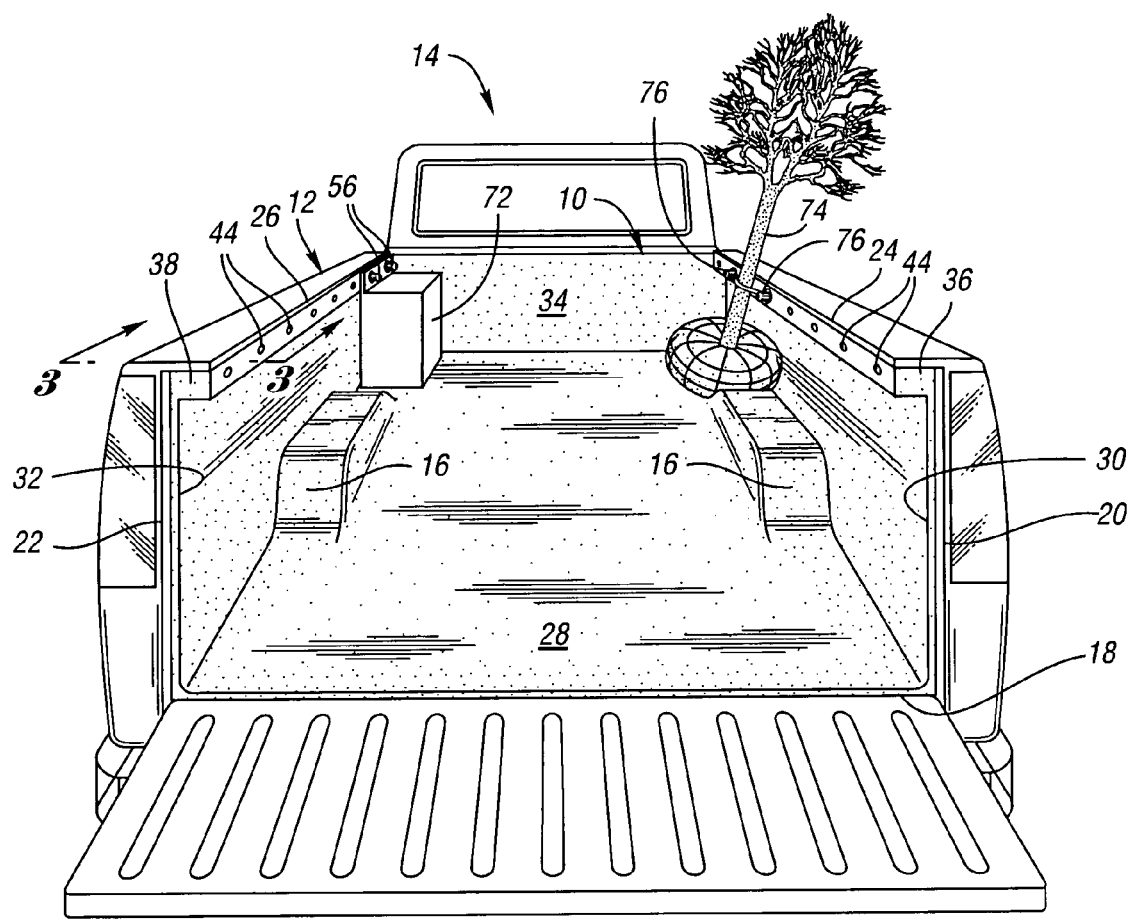
FIG. 1 is a perspective view of the rear of a pickup truck having a bed liner in accordance with the present invention.

FIG. 1 shows a vehicle bed liner 10 in accordance with the present invention, installed in a bed 12 of a truck 14. The bed liner 10, shown in FIG. 1, is specifically configured for a truck bed, such as the truck bed 12. For example, the bed liner 10 includes raised portions 16, which are configured to conform to the wheel wells of the truck 14. Of course, it is understood that a vehicle bed liner, such as the bed liner 10, can be configured for use in a variety of different vehicles. For example, a relatively short bed liner may be configured for use in the cargo area of an SUV or a station wagon. The truck bed 12 includes a bed floor 18 and two opposing bed walls 20, 22. Each of the bed walls 20, 22 includes a corresponding lip 24, 26. Each of the lips 24, 26 extend into the truck bed 12 and is disposed along a length of the corresponding bed wall 20, 22.

Figure 2:
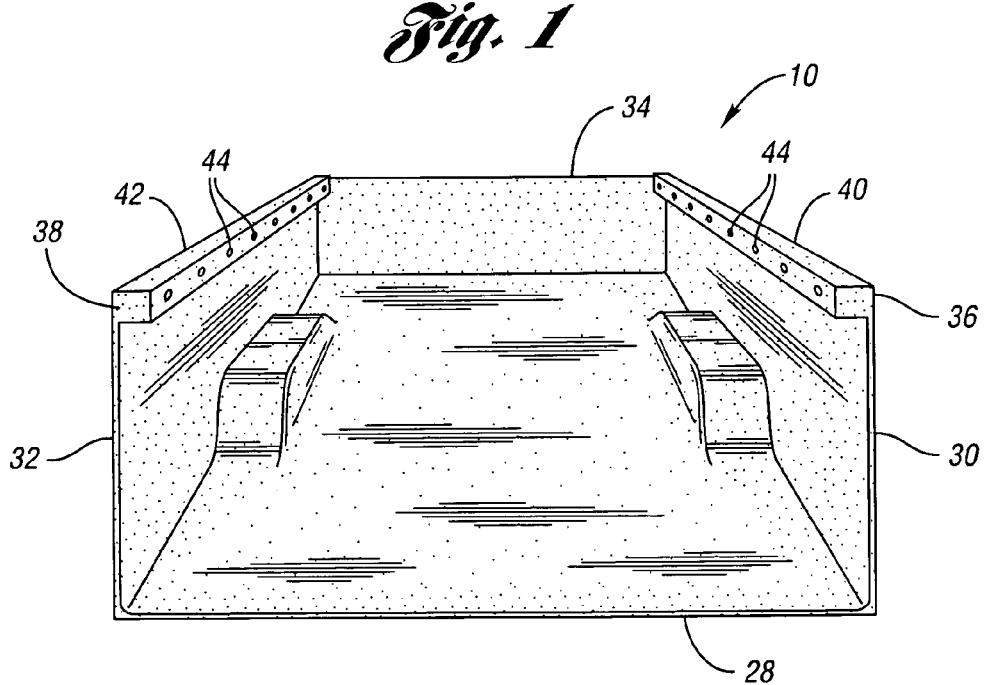
FIG. 2 is a perspective view of the bed liner shown in FIG. 1, removed from the truck.

FIG. 2 shows the bed liner 10 removed from the truck 14. The bed liner 10 includes a first wall, or bed liner floor 28. As shown in FIG. 1, the bed liner floor 28 is configured to be disposed proximate, and generally parallel, to the truck bed floor 18. The bed liner 10 also includes two opposing side walls 30, 32 which are attached to the bed liner floor 28, and extend outward—or, as oriented in FIGS. 1 and 2, upward—from the bed liner floor 28. An optional third wall 34 is also attached to the bed liner floor 28, and extends outward therefrom. Although the third wall 34 may be useful when a bed liner, such as the bed liner 10, is configured for use with a pickup truck, it may be convenient to omit a third wall when a bed liner is configured for use with a different type of vehicle—e.g., an SUV or a station wagon. Omitting a third wall for bed liners used in such vehicles could allow direct access to the bed liner from the vehicle passenger compartment. Moreover, particularly long objects may be more easily stored and carried in an SUV or station wagon if a third wall is omitted from the bed liner.

Each of the side walls 30, 32 includes a corresponding reinforcing member, or rail 36, 38. Each rail 36, 38 is attached to a corresponding side wall 30, 32, and is disposed generally parallel to the bed liner floor 28. In addition, the rails 36, 38 are disposed proximate to corresponding distal edges, or top edges 40, 42 of the side walls 30, 32. Of course, rails, such as the rails 36, 38, could be placed closer to the bed liner floor 28, or a plurality of rails may be placed along each side wall 30, 32. Moreover, rails, such as the rails 36, 38, need not be parallel to the bed liner floor 28, but rather could be oriented at any desired angle. The third wall 34 can also be configured with one or more rails, such as the rails 36, 38. As shown in FIGS. 1 and 2, each of the rails 36, 38, contains a plurality of threaded holes 44. The holes 44, as shown in FIGS. 1 and 2, are approximately equally spaced along the length of each of the rails 36, 38; however, other spacings may be used as desired. In addition, the holes 44 are shown oriented generally parallel to the bed liner floor 28. Other holes in the rails 36, 38 may be oriented differently, for example, vertically, or perpendicular to the bed liner floor 28.

FIG. 3 is a fragmentary sectional view of a portion of the truck bed wall 20 and the bed liner side wall 32. As shown in FIG. 3, the rail 38 is disposed proximate to, and underneath, the lip 26. In addition, the rail 38 is generally flush with the lip 26 so that it does not extend into the truck bed 12 beyond an inside edge 46 of the lip 26. In fact, as shown in FIG. 3, an inside edge 48 of the rail 38 is not quite flush, but rather, is disposed somewhat behind the inside edge 46 of the lip 26. By not protruding into the truck bed 12, each of the rails 36, 38 is conveniently located so as to not interfere with the loading or unloading of objects to and from the truck bed 12.

Also shown in FIG. 3 is a cavity 50 which intersects a threaded hole 44. Each of the threaded holes 44 may have a corresponding cavity, such as the cavity 50. The cavity 50, which is open to an ambient environment 52, need not be of any particular shape, but may conform to the shape of a mold or a cutting tool. The cavity 50 can act as a cleanout for the removal of dirt and debris which may otherwise fill the threaded hole 44. In addition, the cavity 50 can facilitate the cutting of threads 54 in the hole 44 when the threads are formed with a thread tap. The cavity 50 provides a route for removal of chips that may be formed when the threads 54 are cut, and further, may eliminate the necessity of using two different taps—i.e., a starting tap and a bottoming tap.

In addition to the aforementioned functions, the cavities 50 in each of the threaded holes 44 facilitates the use of a lockable threaded fastener, such as the fastener 56, shown in FIG. 4. The fastener 56 includes threads 58 which are configured to mate with the threads 54 in any of the threaded holes 44. The fastener 56 includes a fastener head 60 which, as shown in FIG. 4, may be configured with a special pattern that makes the fastener easy to turn by hand. Conversely, a special pattern may be used so that a special tool is required to remove the fastener 56. The fastener 56 also includes a flange 62 which may eliminate the need to use a separate washer when attaching objects to the bed liner 10.

The fastener 56 is lockable through the use of a selectively extendable and retractable finger 64 disposed at a distal end 66 of the fastener 56. The fastener head 60 is configured with tumblers (not visible) which can be aligned by the use of a key 68 inserted into a slot 70 in the fastener head 60. The fastener 56 is configured such that when it is threaded into one of the threaded holes 44, the finger 64 can be extended into a corresponding cavity 50. Moreover, the finger 64 is configured to be extendable past an outside diameter of the threads 54, thereby inhibiting removal of the fastener 56 from the hole 44 until the finger 64 is retracted.

As shown in FIG. 1, the threaded holes 44 can be used to conveniently attach different objects to the bed liner 10. For example, a tool box 72 can be attached to the bed liner 10 using the lockable fasteners 56. This helps to provide security while the tool box is left unattended. Some tool boxes are attachable through flanges or walls of the tool box that are only accessible inside the tool box. In such a case, a standard bolt, or other threaded fastener, may be used in place of a lockable threaded fastener. For example, FIG. 1 also shows a tree 74 attached to the bed liner 10. Fasteners 76, not having a locking mechanism, may be more convenient to use when an object will not be left unattended, or when access to the fasteners is limited, as in the case of a lockable tool box having mounting holes inside.

In addition to accommodating lockable fasteners, bed liner rails, such as the rails 36, 38, can accommodate a variety of accessories. For example, FIG. 5 shows a portion of a bed liner 77 in phantom, including a side wall 79 and a rail 81. Attached to the rail 81, is a soft bumper 83, which includes a flange 85. The flange 85 includes a bolt hole 87, which is aligned with a vertically oriented threaded hole 89 in the rail 81. The bumper 83 can provide a soft, non-abrasive surface when delicate cargo is being transported. Since the bumper 83 may cover threaded holes, such as the threaded holes 44 shown in FIG. 1, an upper portion of the hole 89 can be used to insert an additional fastener, such as an eye hook, that can be used as an attachment structure for a tie-down.

Figure 6:
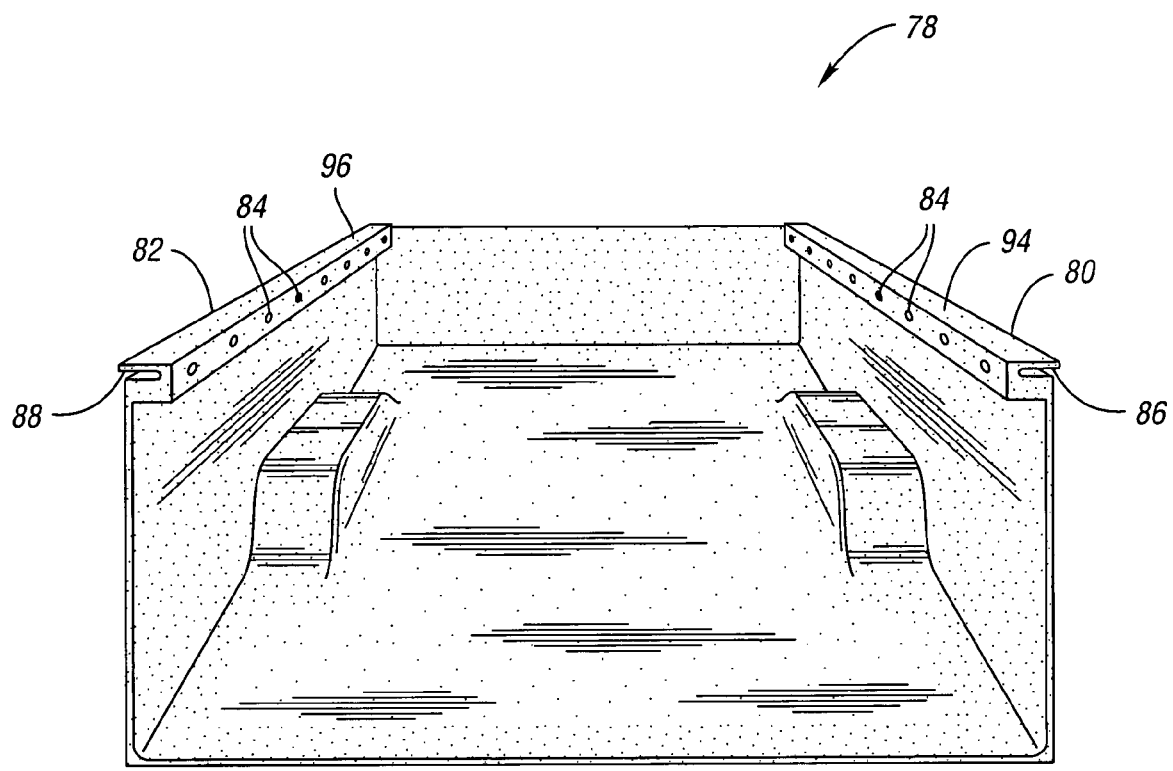
FIG. 6 is a perspective view of an alternative embodiment of a truck bed liner in accordance with the present invention.
Figure 7:
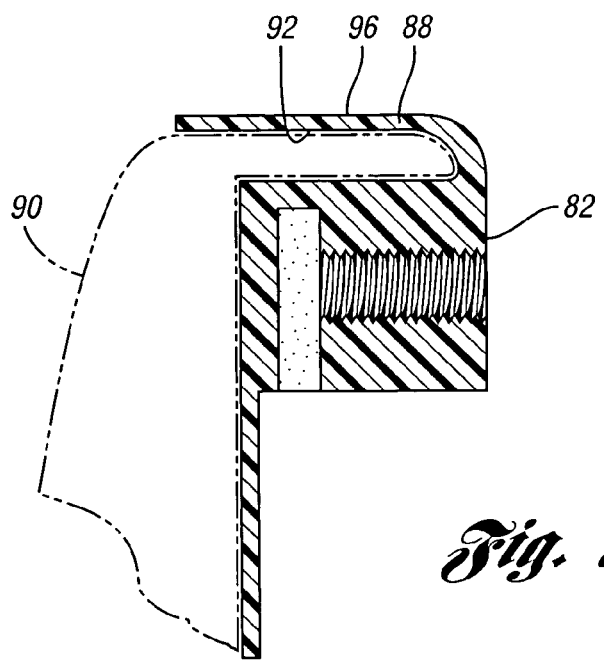
FIG. 7 is a partial fragmentary sectional view of the bed liner shown in FIG. 6.

As shown in FIGS. 1 and 3, the rails 36, 38 are configured to be disposed below the lips 24, 26 of the truck bed walls 20, 22. An alternative design is shown in FIG. 6, wherein a truck bed liner 78 includes rails 80, 82. Each of the rails 80, 82 contains a plurality of threaded holes 84, similarly configured to the holes 44 described above. In addition, each of the rails 80, 82 includes a corresponding slot 86, 88 disposed along its length. Each of the slots 86, 88 is configured to receive a corresponding lip of a truck bed wall, such as the truck bed walls 20, 22. This is illustrated in FIG. 7, which shows a portion of a truck bed wall 90 in phantom, and a portion of the bed liner 78, including the rail 82 and the slot 88. A lip 92 of the truck bed wall 90 is disposed in the slot 88. Each of the rails 80, 82 includes a corresponding upper surface 94, 96. As shown in FIG. 7, the upper surface 96 of the rail 82 is disposed above the lip 92 of the bed wall 90, and provides protection for lip 92. Similarly, the upper surface 94 of the rail 80 provides a protective surface for a corresponding lip on a truck bed wall disposed opposite the truck bed wall 90 (not shown).

A bed liner, such as the bed liners 10 and 78, can be manufactured in a number of different ways. For example, referring to FIG. 1, the bed liner floor 28 and the side walls 30, 32 can be manufactured separately and then attached together in a separate operation. Alternatively, the entire bed liner 10 may comprise a unitary structure that includes the bed liner floor 28, the side walls 30, 32, the rails 36, 38, and the third wall 34. The bed liner 10 can be thermoformed out of a thermoplastic material, such as polyethylene, or some other suitable material. In such an operation, a blank of material is heated and placed in a mold having a cavity. The blank of material is then made to conform to the cavity using a vacuum, a mating dye, or a combination thereof.

Figure 8:
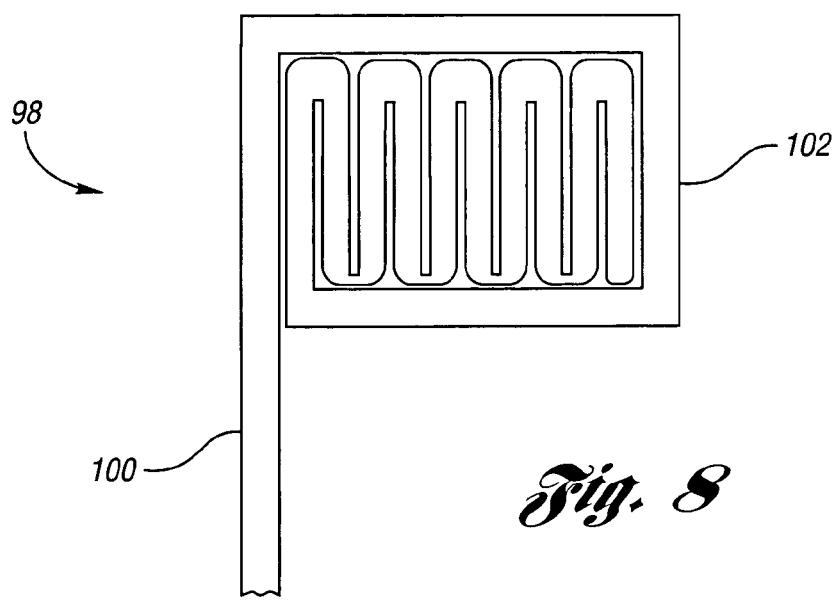
FIG. 8 is a fragmentary side view of a rail formed integrally with a bed liner side wall.

Because it may be desirable use of blanks that are relatively thin and of uniform thickness, the rails can be formed by compacting some of the blank material after the thermoforming process is complete. Illustrative of such a process, FIG. 8 shows a side view of a portion of a bed liner 98, including a side wall 100 and a rail 102. The rail 102 includes relatively thin blank material that has been folded during a compacting process to form the rail 102. If the rail 102 is heated during the compacting process, the material can be integrated into a solid structure, such as shown in FIGS. 1–3. Of course, a unitary truck bed liner, such as the bed liner 10, may be manufactured using other processes, for example, injection molding or casting.

Another method of manufacturing a vehicle bed liner, such as the bed liner 10, is to form the bed liner floor and side walls separately from the rails, and then attach the rails to corresponding sidewalls in a secondary operation. This method has the benefits of reducing the complexity of the molding process, and allows the bed liner floor and side walls to be easily stacked for shipment. The rails can be stacked separately, and the finished bed liner can be assembled at the point of purchase, for example, at an automobile dealership.

Figure 9:
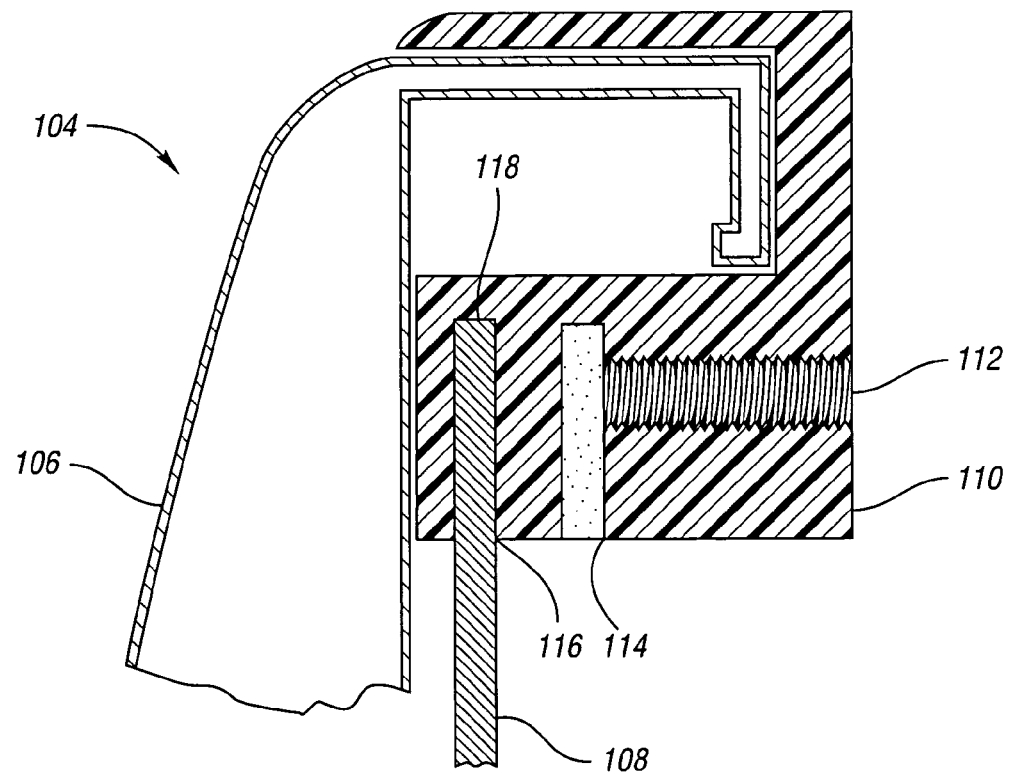
FIG. 9 is a partial fragmentary side sectional view of a bed liner wall formed separately from, and attached to, a rail, which is attached to a portion of a truck bed wall.

FIG. 9 shows a sectional view of a portion of a bed liner 104 attached to a truck side wall 106. The bed liner 104 includes a side wall 108 that is separate from a rail 110. In addition to a threaded hole 112 and a cavity 114, the rail 110 also includes a channel 116. The channel 116 is disposed along a length of the rail 110, and is configured to receive a distal edge 118 of the side wall 108. The side wall 108 and the rail 110 can be hand fit together, and then more securely attached using a chemical bond, such as solvent welding. Alternatively, a mechanical bond, such as screws or the like can be used. Of course, if additional fastening strength is desired, a combination of chemical and mechanical bonding can be used to attach the side wall 108 to the rail 110.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A bed liner for a vehicle having a vehicle bed including a floor, the bed liner comprising:
a first wall configured to be disposed proximate and generally parallel to the vehicle bed floor;
two opposing side walls attached to the first wall and extending outward therefrom; and
a pair of reinforcing members, each of the reinforcing members being attached to a distal edge of a corresponding one of the side walls and including a plurality of threaded holes therein, each of the reinforcing members being a unitary structure having the threads of the threaded holes formed therein.

2. The bed liner of claim 1, wherein the first wall is integrally formed with the two opposing side walls and the reinforcing members from a thermoplastic material.

3. The bed liner of claim 1, wherein each of the reinforcing members comprises a rail, each of the rails being disposed along a length of the distal edge of a corresponding one of the side walls.

4. The bed liner of claim 3, wherein each of the rails includes a channel disposed along a length of the rail, each of the channels being configured to receive the distal edge of a corresponding one of the side walls.

5. The bed liner of claim 3, wherein the threaded holes are approximately equally spaced along a length of each rail.

6. The bed liner of claim 3, the vehicle bed being a truck bed having opposing bed walls, each of the bed walls including a lip extending into the truck bed and disposed along a length of a corresponding one of the bed walls, wherein each of the rails are configured to be proximately disposed underneath a corresponding one of the lips, and generally flush with the corresponding lip.

7. The bed liner of claim 3, the vehicle bed being a truck bed having opposing bed walls, each of the bed walls including a lip extending into the truck bed and disposed along a length of a corresponding one of the bed walls, wherein each of the rails includes a slot disposed therein along a length of the rail, each of the slots being configured to receive a corresponding one of the lips.

8. The bed liner of claim 1, wherein each of the side walls includes a plurality of cavities, each of the cavities intersecting a corresponding one of the threaded holes and being in communication with an ambient environment.

9. The bed liner of claim 8, further comprising a lockable threaded fastener configured to thread into at least one of the threaded holes having a cavity intersecting therewith, the lockable threaded fastener having a distal end configured for insertion into the at least one hole, and including a selectively extendable and retractable finger disposed at the distal end, the finger being extendable beyond the at least one hole and into the cavity intersecting therewith, thereby inhibiting removal of the lockable threaded fastener from the at least one hole until the finger is retracted.

10. A bed liner for a truck having a truck bed defined by a bed floor and two opposing bed walls, each of the bed walls including a lip extending into the truck bed and disposed along a length of a corresponding one of the bed walls, the bed liner comprising:
- a first wall configured to be disposed proximate and generally parallel to the bed floor;
- two opposing side walls integrally formed with the first wall and extending outward therefrom; and
- a pair of reinforcing members, each of the reinforcing members being attached to a corresponding one of the side walls along a length of the corresponding side wall, each of the reinforcing members including a plurality of threaded holes therein, at least some of the threaded holes being oriented generally parallel to the bed floor, each of the reinforcing members being formed without the addition of any separate fastening elements, such that the threads of the threaded holes are formed directly in the reinforcing members.

11. The bed liner of claim 10, wherein each of the side walls includes a distal edge disposed away from, and generally parallel to, the bed floor, and wherein each of the reinforcing members includes a channel disposed along a length of the reinforcing member, each of the channels being configured to receive the distal edge of a corresponding one of the side walls.

12. The bed liner of claim 10, wherein the threaded holes are approximately equally spaced along a length of each reinforcing member.

13. The bed liner of claim 10, wherein each of the reinforcing members are configured to be proximately disposed underneath a corresponding one of the lips, and generally flush with the corresponding lip.

14. The bed liner of claim 10, wherein each of the reinforcing members includes a slot disposed therein along a length of the reinforcing member, each of the slots being configured to receive a corresponding one of the lips, thereby disposing at least some of the reinforcing members above the corresponding lip when the bed liner is installed in the truck bed.

15. The bed liner of claim 10, wherein each of the reinforcing members includes a plurality of cavities, each of the cavities intersecting a corresponding one of the threaded holes and being in communication with an ambient environment.

16. The bed liner of claim 15, further comprising a lockable threaded fastener configured to thread into at least one of the threaded holes having a cavity intersecting therewith, the lockable threaded fastener having a distal end configured for insertion into the at least one hole, and including a selectively extendable and retractable finger disposed at the distal end, the finger being extendable beyond the at least one hole and into the cavity intersecting therewith, thereby inhibiting removal of the lockable threaded fastener from the at least one hole until the finger is retracted.

17. A bed liner for a vehicle having a vehicle bed including a floor, the bed liner comprising:
- a first wall configured to be disposed proximate and generally parallel to the vehicle bed floor;
- two opposing side walls attached to the first wall and extending outward therefrom; and
- a pair of reinforcing members, each of the reinforcing members being attached to a distal edge of a corresponding one of the side walls and including a plurality of threaded holes therein, each of the reinforcing members including a plurality of cavities, each of the cavities intersecting a corresponding one of the threaded holes and being in communication with an ambient environment.

18. The bed liner of claim 17, wherein each of the reinforcing members comprises a rail, each of the rails being disposed along a length of the distal edge of a corresponding one of the side walls.

19. The bed liner of claim 18, the vehicle bed being a truck bed having opposing bed walls, each of the bed walls including a lip extending into the truck bed and disposed along a length of a corresponding one of the bed walls, wherein each of the rails are configured to be proximately disposed underneath a corresponding one of the lips, and generally flush with the corresponding lip.

20. The bed liner of claim 18, the vehicle bed being a truck bed having opposing bed walls, each of the bed walls including a lip extending into the truck bed and disposed along a length of a corresponding one of the bed walls, wherein each of the rails includes a slot disposed therein along a length of the rail, each of the slots being configured to receive a corresponding one of the lips.

* * * * *